US010121562B2

(12) United States Patent
Hong et al.

(10) Patent No.: US 10,121,562 B2
(45) Date of Patent: Nov. 6, 2018

(54) GRAPHENE-NANOMATERIAL COMPLEX, FLEXIBLE AND STRETCHABLE COMPLEX COMPRISING THE SAME AND METHODS FOR MANUFACTURING COMPLEXES

(71) Applicant: Korea Advanced Institute of Science and Technology, Daejeon (KR)

(72) Inventors: Soon Hyung Hong, Daejeon (KR); Ho Jin Ryu, Daejeon (KR); Gwang Hoon Jun, Daejeon (KR); Jae Young Oh, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 75 days.

(21) Appl. No.: 15/131,799

(22) Filed: Apr. 18, 2016

(65) Prior Publication Data

US 2017/0069404 A1 Mar. 9, 2017

(30) Foreign Application Priority Data

Sep. 3, 2015 (KR) ........................ 10-2015-0124890

(51) Int. Cl.
*H01B 1/04* (2006.01)
*B82Y 30/00* (2011.01)
*H01B 1/24* (2006.01)

(52) U.S. Cl.
CPC ..................................... *H01B 1/04* (2013.01)

(58) Field of Classification Search
CPC ... H01B 1/04; H01B 1/22; H01B 1/24; B82Y 30/00
USPC .................................. 252/510, 511; 977/779
See application file for complete search history.

(56) References Cited

U.S. PATENT DOCUMENTS

2011/0260116 A1* 10/2011 Plee ........................ B82Y 30/00 252/511

FOREIGN PATENT DOCUMENTS

KR 20150033867 4/2015

OTHER PUBLICATIONS

Yu "Enhanced Thermal Conductivity in a Hybrid Graphite Nanoplatelet—Carbon Nanotube Filler for Epoxy Composites." Adv. Mater . 2008, 20, 4740-4744 (Year: 2008).*

(Continued)

*Primary Examiner* — Tri V Nguyen
(74) *Attorney, Agent, or Firm* — Marsh Fischmann & Breyfogle LLP

(57) ABSTRACT

The present disclosure relates to a graphene-nanomaterial complex, a flexible and stretchable complex including the same, and methods for manufacturing the complexes. A graphene-nanomaterial complex according to a first aspect of the present disclosure includes a plurality of graphenes and nanomaterials disposed between the graphenes, in which the graphenes are not disposed on the same plane to form a three-dimensional (3D) graphene structure, and the graphenes, the nanomaterials or both form an electrical network.

16 Claims, 7 Drawing Sheets

(56) References Cited

OTHER PUBLICATIONS

Yi "The synergistic effect of the combined thin multi-walled carbon nanotubes and reduced graphene oxides on photothermally actuated shape memory polyurethane composites." Journal of Colloid and Interface Science 432 (2014) 128-134 (Year: 2014).*
Wu "Three-Dimensional Highly Conductive Graphene-Silver Nanowire Hybrid Foams for Flexible and Stretchable Conductors." ACS Appl. Mater. Interfaces 2014, 6, 21026-21034 (Year: 2014).*
Saadatabadi "Fabrication and characterization of nanosilver intercalated graphene embedded poly(vinyl chloride)composite thin films." J Polym Res (2014) 21:527 (Year: 2014).*

* cited by examiner

GRAPHENE-NANOMATERIAL COMPLEX, FLEXIBLE AND STRETCHABLE COMPLEX COMPRISING THE SAME AND METHODS FOR MANUFACTURING COMPLEXES

CROSS-REFERENCE TO RELATED APPLICATION

This application claims the priority benefit of Korean Patent Application No. 10-2015-0124890 filed on Sep. 3, 2015, in the Korean Intellectual Property Office, the disclosure of which is incorporated herein by reference.

BACKGROUND

1. Technical Field

Example embodiments relate to a graphene-nanomaterial complex, a flexible and stretchable complex including the same, and methods for manufacturing the complexes.

2. Description of the Related Art

With a recent trend to emphasis on lightness, portability, and design of electronic devices, flexible and stretchable electronic materials are receiving growing attention. To develop flexible and stretchable electronic materials, materials for flexible and stretchable conductors need to be developed first. Methods for manufacturing flexible and stretchable conductors can be largely divided into two types. One method is to impart flexibility and stretchability to a conductive material, in which a high-conductivity material, such as a metal, is made thin to be ductile and is formed into a wavy or buckle structure. The other method is to impart electroconductive properties to a flexible and stretchable material, in which a conductive additive and a flexible and stretchable elastomeric base are formed into a complex. In this method, the conductive additive is required to have excellent conductivity and to be capable of forming an electrical network in the base even in small amounts in order to maintain flexibility and stretchability of the elastomeric base. To satisfy the foregoing requirements, extensive studies are being conducted recently using conductive additives having excellent electrical and mechanical properties, such as carbon nanotubes, graphene, and metal nanowire. However, as the biggest problem in using carbon nanotubes, graphene, and metal nanowire as an additive for a flexible and stretchable conductor, it is difficult to disperse the additive in a polymer base. To solve such a problem, studies on dispersibility improvement using functional materials and dispersibility improvement through structural modification are being conducted in order to improve dispersibility of carbon nanotubes, graphene, and metal nanowire. Further, there is a need to develop a method for improving electrical conductivity of the complex with a minimum amount of the conductive additive being added.

SUMMARY

To solve the foregoing problem, an aspect is to provide a graphene-nanomaterial complex including graphenes formed in three dimensions and nanomaterials, a flexible and stretchable complex including the graphene-nanomaterial complex which has excellent dispersibility in a flexible and stretchable polymer and forms an electrical network to exhibit excellent electrical conductivity even though being present in a small amount in the polymer, and methods for manufacturing the complexes.

However, the problem to be solved by the present disclosure is not limited to the foregoing problems, and other problems not mentioned herein would be clearly understood by a person skilled in the art from the following description.

According to a first aspect, there is provided a graphene-nanomaterial complex including a plurality of graphenes and nanomaterials disposed between the graphenes, wherein the graphenes are not disposed on the same plane to form a three-dimensional (3D) graphene structure, and the graphenes, the nanomaterials or both form an electrical network.

The nanomaterials may include at least one selected from the group consisting of nano particles, a nanorod, a nanotube, and a nanowire.

The nanomaterials may include at least one selected from the group consisting of a metal, a semiconducting material, a conductive polymer, a conductive oxide, a conductive nitride, a conductive carbide, and a carbon nanotube.

The metal may include at least one selected from the group consisting of silver (Ag), gold (Au), platinum (Pt), ruthenium (Ru), aluminum (Al), iridium (Ir), palladium (Pd), tungsten (W), molybdenum (Mo), iron (Fe), cobalt (Co), and copper (Cu), the semiconducting material may include at least one selected from the group consisting of Si, $MoSi_2$, $WSi_2$, $TiSi_2$, $TaSi_2$, $NiCoSi_2$, $NiSi_2$, and $PtSi_2$, the conductive polymer may include at least one selected from the group consisting of Poly(fluorene)s, polyphenylenes, polypyrenes, polyazulenes, polynaphthalenes, poly(pyrrole)s (PPY), polycarbazoles, polyindoles, polyazepines, polyanilines (PANI), poly(thiophene)s (PT), poly(3,4-ethylenedioxythiophene) (PEDOT), poly(p-phenylene sulfide) (PPS), Poly(acetylene)s (PAC), and Poly(p-phenylene vinylene) (PPV), the conductive oxide may include at least one selected from the group consisting of indium tin oxide (ITO), ZnO, MgO, CaO, SrO, $CoO_x$, $VO_x$, FeO, $MoO_x$, $WO_x$, $Cr_2O_3$, $Ga_2O_3$, $Al_2O_3$, $In_2O_3$, $SnO_2$, and $TiO_2$, the conductive nitride may include at least one selected from the group consisting of TiN, TaN, NbN, ZrN, $Si_3N_4$, AlN, GaN, InN, and $Mo_2N$, the conductive carbide may include at least one selected from the group consisting of WC, TiC, and SiC, and the carbon nanotube may include at least one selected from the group consisting of a single-walled carbon nanotube (SWCNT), a double-walled carbon nanotube (DWCNT), and a multi-walled carbon nanotube (MWCNT).

The nanomaterials may be present in an amount of 10 by weight (wt %) to 99.99 wt % in the graphene-nanomaterial complex.

According to a second aspect, there is provided a method of manufacturing a graphene-nanomaterial complex, the method including manufacturing a 3D graphene structure including graphenes irregularly arranged; and disposing nanomaterials between the graphenes of the 3D graphene structure by impregnating the 3D graphene structure in a nanomaterial dispersion solution, wherein the graphenes are not disposed on the same plane to form a 3D graphene structure, and the graphenes, the nanomaterials or both form an electrical network.

The manufacturing of the 3D graphene structure may include at least one selected from the group consisting of a hydrothermal synthesis method, a synthesis method using a binder, and a 3D metal structure graphene growth method.

The disposing of the nanomaterials between the 3D graphenes may include arranging the nanomaterials on a surface of graphenes to be combined therewith.

According to a third aspect, there is provided a flexible and stretchable complex including the graphene-nanomaterial complex according to the first aspect; and a flexible and stretchable polymer including the graphene-nanomaterial complex.

The polymer may include at least one selected from the group consisting of a polysiloxane base rubber, a one-part silicone rubber, a butadiene base rubber, and an acrylic base rubber.

The polymer may include at least one selected from the group consisting of polydimethylsiloxane (PDMS), polyethylene terephthalate (PET), polyvinylidene fluoride (PVDF), polyethersulfone (PES), polystyrene (PS), polycarbonate (PC), polyimide (PI), polyethylene naphthalate (PEN), and polyarylate (PAR).

The flexible and stretchable complex may have a strain rate of 1,000% or lower. The flexible and stretchable complex may have an electrical conductivity of $1\times10^{-15}$ S/cm to $1\times10^{7}$ S/cm.

The nanomaterials may be present in an amount of 0.01 wt % to 80 wt % in the flexible and stretchable complex.

According to a fourth aspect, there is provided a method of manufacturing a flexible and stretchable complex which includes manufacturing a graphene-nanomaterial complex by the method according to the second aspect; and including the graphene-nanomaterial complex in a flexible and stretchable polymer by impregnating the graphene-nanomaterial complex in a solution including the flexible and stretchable polymer and curing the graphene-nanomaterial complex.

According to embodiments, a graphene-nanomaterial complex in which graphenes formed in three dimensions and nanomaterials form an electrical network has excellent dispersibility in a polymer and exhibits excellent electrical conductivity. Further, the graphene-nanomaterial complex and a flexible and stretchable polymer including the graphene-nanomaterial complex may be used to manufacture a flexible and stretchable conductor that has excellent electrical conductivity since the graphenes and nanomaterials form a network for electron transfer in the flexible and stretchable polymer even in the presence of small amounts thereof.

BRIEF DESCRIPTION OF THE DRAWINGS

These and/or other aspects, features, and advantages of the present disclosure will become apparent and more readily appreciated from the following description of embodiments, taken in conjunction with the accompanying drawings of which.

DETAILED DESCRIPTION

Figure 1:
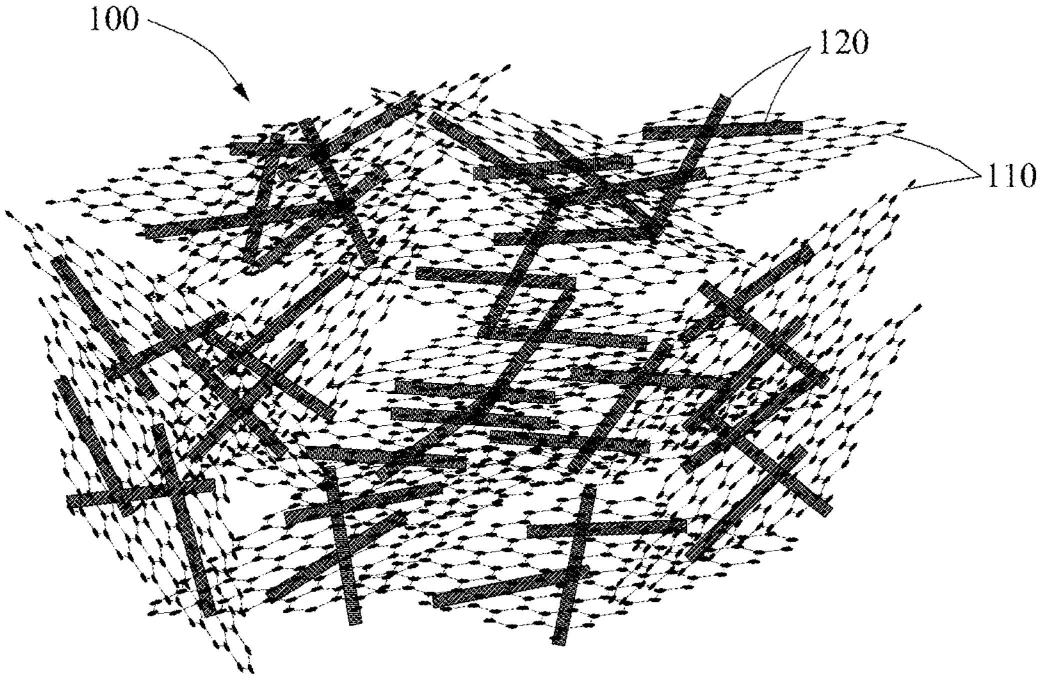
FIG. 1 schematically illustrates a graphene-nanomaterial complex according to an example embodiment.

Hereinafter, example embodiments of the present disclosure will be described in detail with reference to the accompanying drawings. When it is determined detailed description related to a related known function or configuration they may make the purpose of the present disclosure unnecessarily ambiguous in describing the present disclosure, the detailed description will be omitted here. Also, terms used herein are defined to appropriately describe the example embodiments of the present disclosure and thus may be changed depending on a user, the intent of an operator, or a custom. Accordingly, the terms must be defined based on the following overall description of this specification. Like reference numerals present in the drawings refer to the like elements throughout.

It will be understood throughout the whole specification that when a member is referred to as being "on" another member, the member is directly on another member or an intervening member exists therebetween.

It will be understood throughout the whole specification that, unless specified otherwise, when one part "includes" or "comprises" one component, the part does not exclude other components but may further include the other components.

Hereinafter, a graphene-nanomaterial complex, a flexible and stretchable complex including the same, and methods for manufacturing the complexes according to the present disclosure will be described in detail with reference to embodiments and drawings. However, the present disclosure is not limited to the embodiments and the drawings.

A first aspect of the present disclosure provides a graphene-nanomaterial complex including a plurality of graphenes and nanomaterials disposed between the graphenes, in which the graphenes are not disposed on the same plane to form a three-dimensional (3D) graphene structure, and the graphenes, the nanomaterials or both form an electrical network.

FIG. 1 schematically illustrates a graphene-nanomaterial complex according to an example embodiment. Referring to FIG. 1, the graphene-nanomaterial complex 100 according to the embodiment includes a plurality of graphenes 110 and nanomaterials 120. The graphenes 110 are not disposed on the same plane to form a 3D graphene structure. In FIG. 1, relative sizes of the graphenes 110 and the nanomaterials 120 may be exaggerated for understanding of a configuration of the graphene-nanomaterial complex 100 and be different from precise scales.

The nanomaterials may include at least one selected from the group consisting of nano particles, a nanorod, a nanotube, and a nanowire. These nanomaterials are randomly disposed between the graphenes so that the graphenes and the nanomaterials form an electrical network.

The nanomaterials may include at least one selected from the group consisting of a metal, a semiconducting material, a conductive polymer, a conductive oxide, a conductive nitride, a conductive carbide, and a carbon nanotube. The metal may include at least one selected from the group consisting of silver (Ag), gold (Au), platinum (Pt), ruthenium (Ru), aluminum (Al), iridium (Ir), palladium (Pd), tungsten (W), molybdenum (Mo), iron (Fe), cobalt (Co), and copper (Cu). The semiconducting material may include at least one selected from the group consisting of Si, $MoSi_2$, $WSi_2$, $TiSi_2$, $TaSi_2$, $NiCoSi_2$, $NiSi_2$, and $PtSi_2$. The conductive polymer may include at least one selected from the group consisting of Poly(fluorene)s, polyphenylenes, polypyrenes, polyazulenes, polynaphthalenes, poly(pyrrole)s (PPY), polycarbazoles, polyindoles, polyazepines, polyanilines (PANI), poly(thiophene)s (PT), poly(3,4-ethylenedioxythiophene) (PEDOT), poly(p-phenylene sulfide) (PPS), Poly(acetylene)s (PAC), and Poly(p-phenylene vinylene) (PPV). The conductive oxide may include at least one selected from the group consisting of indium tin oxide (ITO), ZnO, MgO, CaO, SrO, $CoO_x$, $VO_x$, FeO, $MoO_x$, $WO_x$, $Cr_2O_3$, $Ga_2O_3$, $Al_2O_3$, $In_2O_3$, $SnO_2$, and $TiO_2$. The conductive nitride may include at least one selected from the group consisting of TiN, TaN, NbN, ZrN, $Si_3N_4$, AlN, GaN, InN, and $Mo_2N$. The conductive carbide may include at least one selected from the group consisting of WC, TiC, and SiC The carbon nanotube may include at least one selected from the group consisting of a single-walled carbon nanotube (SWCNT), a double-walled carbon nanotube (DWCNT), and a multi-walled carbon nanotube (MWCNT).

The nanomaterials may be disposed on a surface of the graphenes. The nanomaterials are disposed on the surface of the graphenes connected in a 3D structure, thereby forming an electrical path between the nanomaterials.

The nanomaterials may be present in an amount of 10 by weight (wt %) to 99.99 wt % in the graphene-nanomaterial complex. When the amount of the nanomaterials is less than 10 wt %, the manufactured graphene-nanomaterial complex may not secure sufficient conductivity. When the amount of the nanomaterials is greater than 99.99 wt %, the complex may not secure excellent physical properties of graphene as an electronic material.

The graphene-nanomaterial complex 100 according to the embodiment may have excellent electrical conductivity as the graphenes and the nanomaterials form an electrical network for electron transfer.

A second aspect of the present disclosure provides a method of manufacturing a graphene-nanomaterial complex which includes manufacturing a 3D graphene structure including graphenes irregularly arranged and disposing nanomaterials between the graphenes of the 3D graphene structure by impregnating the 3D graphene structure in a nanomaterial dispersion solution, in which the graphenes are not disposed on the same plane to form a 3D graphene structure, and the graphenes, the nanomaterials or both form an electrical network.

Figure 2:
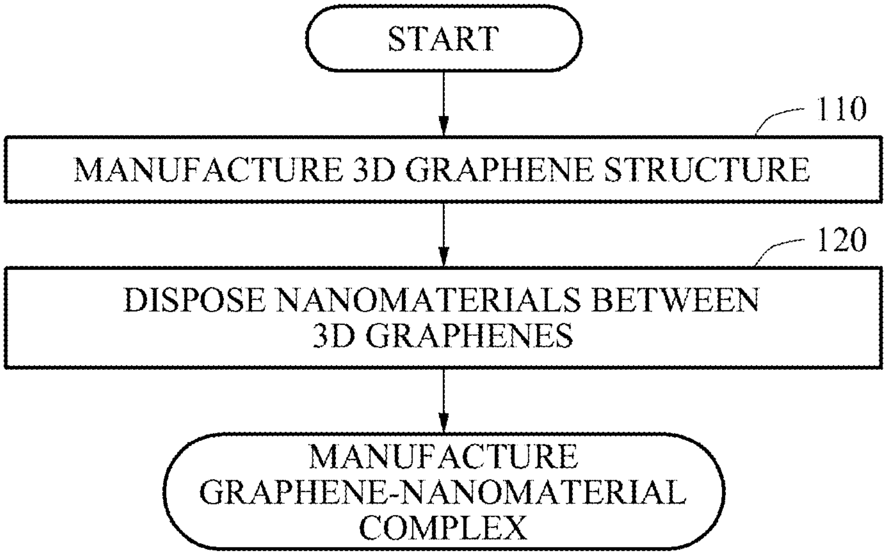
FIG. 2 is a flowchart illustrating a method of manufacturing a graphene-nanomaterial complex according to an example embodiment.
Figure 3A:
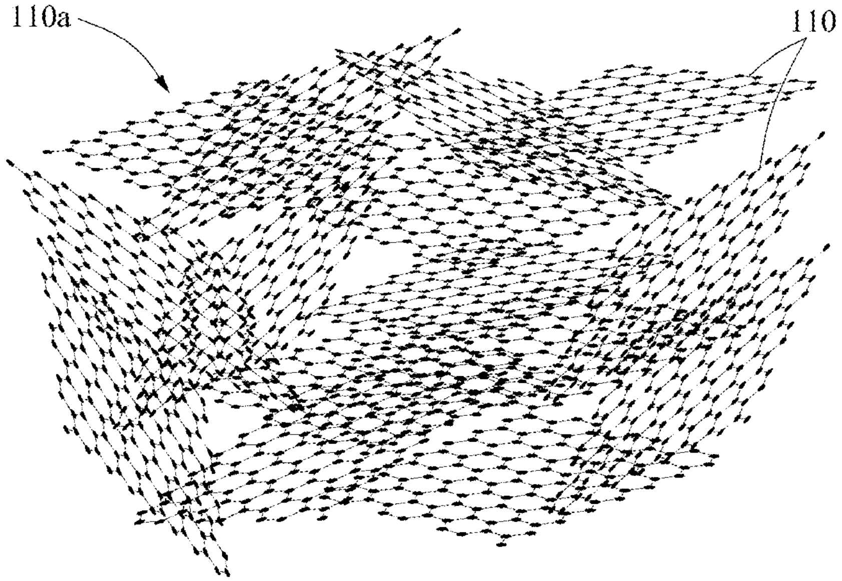
FIGS. 3A and 3B schematically illustrate a process of manufacturing a graphene-nanomaterial complex according to an example embodiment.
Figure 3B:
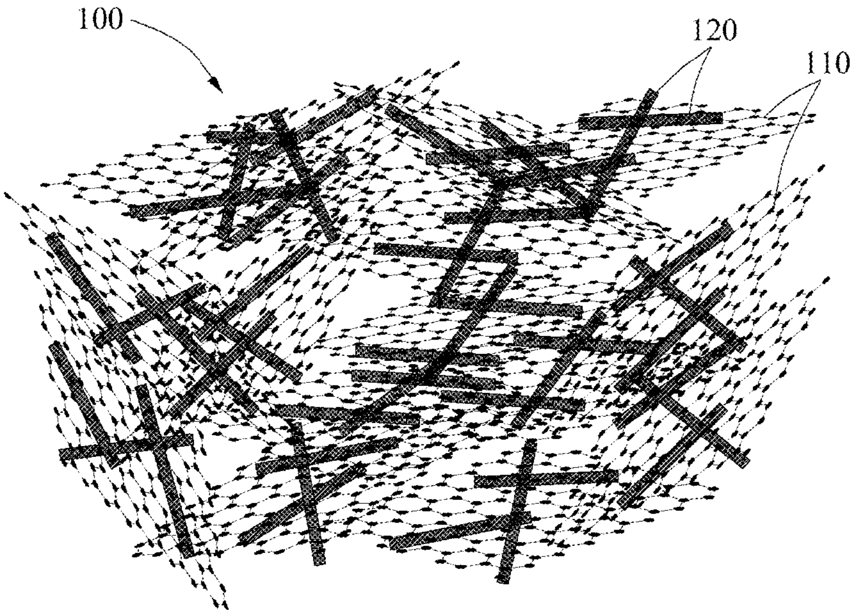

FIG. 2 is a flowchart illustrating a method of manufacturing a graphene-nanomaterial complex according to an example embodiment, and FIGS. 3A and 3B schematically illustrate a process of manufacturing a graphene-nanomaterial complex according to an example embodiment. Referring to FIGS. 2, 3A, and 3B, the method of manufacturing the graphene-nanomaterial complex 100 according to the embodiment includes manufacturing a 3D graphene structure 110*a* in operation 110 and disposing nanomaterials 120 between 3D graphenes 110 in operation 120.

The manufacturing of the 3D graphene structure manufactures a 3D graphene structure such that graphenes are irregularly arranged not to be disposed on the same plane.

A method for manufacturing of the 3D graphene structure may include at least one selected from the group consisting of a hydrothermal synthesis method, a synthesis method using a binder, and a 3D metal structure graphene growth method.

According to the hydrothermal synthesis method, a graphene oxide obtained, for example, by a Hummers' method is dispersed in water as a hydrophilic solution by ultrasonic waves, after which the resulting solution is transferred to a Teflon reaction vessel and subjected to hydrothermal reaction, for example, at 180° C. for 1 hour. After hydrothermal reaction, the solution is cooled at room temperature, and dried by freezing to remove a solvent of the finally obtained 3D graphene structure solution, thereby manufacturing a 3D graphene structure.

According to the synthesis method using the binder, a graphene oxide obtained by a Hummers' method is formed into a 3D graphene structure in a solvent using an organic binder material, such as resorcinol and formaldehyde, by a sol-gel method, and subjected to supercritical drying to remove the solvent, thereby manufacturing a 3D graphene structure.

According to the 3D metal structure graphene growth method, graphene is allowed to grow on a metal substrate using a metal foam, such as a 3D structure of nickel or copper, by chemical vapor deposition, after which the metal foam is removed, thereby manufacturing a 3D graphene structure.

The disposing of the nanomaterials between the 3D graphenes may dispose the nanomaterials between the 3D graphenes by impregnating the 3D graphene structure in a nanomaterial dispersion solution.

The nanomaterials may include at least one selected from the group consisting of nano particles, a nanorod, a nanotube, and a nanowire.

The nanomaterials may include at least one selected from the group consisting of a metal, a semiconducting material, a conductive polymer, a conductive oxide, a conductive nitride, a conductive carbide, and a carbon nanotube. The metal may include at least one selected from the group consisting of silver (Ag), gold (Au), platinum (Pt), ruthenium (Ru), aluminum (Al), iridium (Ir), palladium (Pd), tungsten (W), molybdenum (Mo), iron (Fe), cobalt (Co) and copper (Cu). The semiconducting material may include at least one selected from the group consisting of Si, $MoSi_2$, $WSi_2$, $TiSi_2$, $TaSi_2$, $NiCoSi_2$, $NiSi_2$ and $PtSi_2$. The conductive polymer may include at least one selected from the group consisting of Poly(fluorene)s, polyphenylenes, polypyrenes, polyazulenes, polynaphthalenes, poly(pyrrole)s (PPY), polycarbazoles, polyindoles, polyazepines, polyanilines (PAM), poly(thiophene)s (PT), poly(3,4-ethylenedioxythiophene) (PEDOT), poly(p-phenylene sulfide) (PPS), Poly(acetylene)s (PAC), and Poly(p-phenylene vinylene) (PPV). The conductive oxide may include at least one selected from the group consisting of ITO, ZnO, MgO, CaO, SrO, $CoO_x$, $VO_x$, FeO, $MOO_x$, $WO_x$, $Cr_2O_3$, $Ga_2O_3$, $Al_2O_3$, $In_2O_3$, $SnO_2$ and $TiO_2$. The conductive nitride may include at least one selected from the group consisting of TiN, TaN, NbN, ZrN, $Si_3N_4$, AlN, GaN, InN, and $Mo_2N$. The conductive carbide may include at least one selected from the group consisting of WC, TiC, and SiC. The carbon nanotube may include at least one selected from the group consisting of an SWCNT, a DWCNT and an MWCNT.

The nanomaterials may be disposed on a surface of the 3D graphene structure to exhibit electrical conductivity.

For example, when the nanomaterials are an SWCNT, the SWCNT may be manufactured by a high-pressure carbon monoxide (HiPco) process, an arc-discharge process, or other methods. When the nanomaterials 120 are an MWCNT, the MWCNT may be manufactured by chemical vapor deposition or other methods.

The solution may be a solution capable of thoroughly dispersing the nanomaterials 120, which may be, for example, at least one selected from the group consisting of water, distilled water (ultrapure water), aqueous solutions of sodium hydroxide (NaOH), potassium hydroxide (KOH), ammonium hydroxide ($NH_4OH$), lithium hydroxide (LiOH) and calcium hydroxide ($Ca(OH)_2$), acetone, methyl ethyl ketone, methyl alcohol, ethyl alcohol, isopropyl alcohol, butyl alcohol, ethylene glycol, polyethylene glycol, tetrahydrofuran, dimethylformamide, dimethylacetamide, N-methyl-2-pyrrolidone, hexane, cyclohexanone, toluene, chloroform, dichlorobenzene, dimethylbenzene, trimethylbenzene, pyridine, methylnaphthalene, nitromethane, acrylonitrile, octadecylamine, aniline, and dimethyl sulfoxide.

The disposing of the nanomaterials between the 3D graphenes may be arranging the nanomaterials on a surface of graphenes to be combined therewith. The nanomaterials are arranged on and combined with the surface of the graphenes connected in the 3D structure, thereby manufacturing a graphene-nanomaterial complex forming an electrical path between the nanomaterials.

A third aspect of the present disclosure provides a flexible and stretchable complex including the graphene-nanomaterial complex according to the first aspect and a flexible and stretchable polymer including the graphene-nanomaterial complex.

Figure 4:
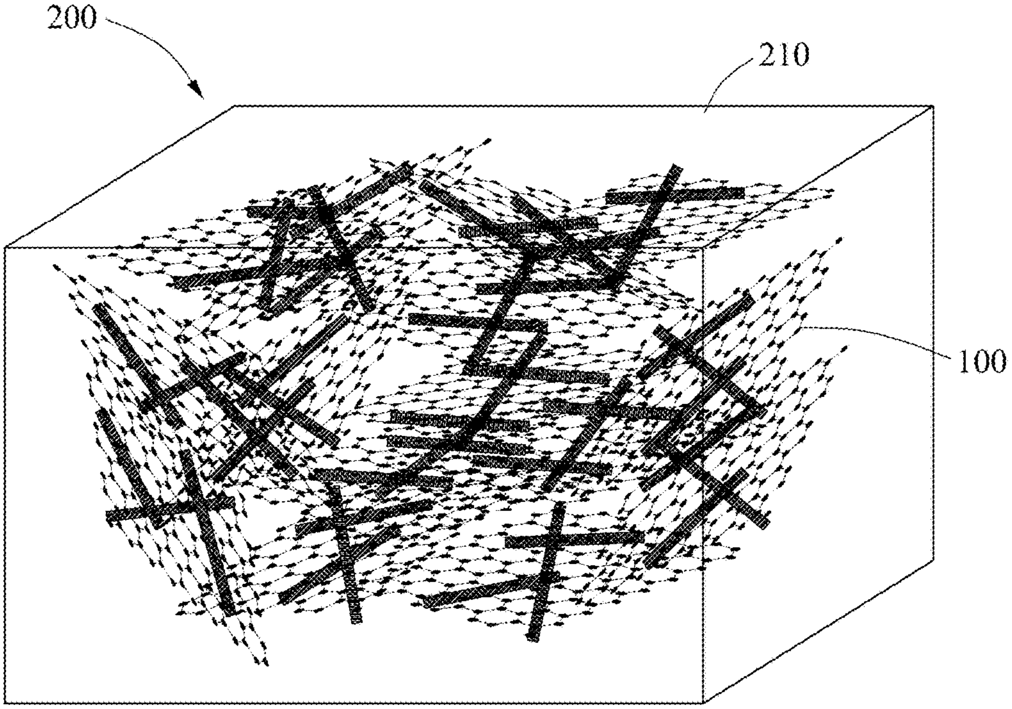
FIG. 4 schematically illustrates a flexible and stretchable complex according to an example embodiment.

FIG. 4 schematically illustrates a flexible and stretchable complex according to an example embodiment of the present disclosure. Referring to FIG. 4, the flexible and stretchable complex 200 according to the example embodiment has a structure in which the graphene-nanomaterial complex 100 is dispersed in the flexible and stretchable polymer 210 and thus may be used as a stretchable conductor having excellent electrical conductivity.

The polymer is a polymer material having flexibility and stretchabiblity at room temperature, which may include, for example, at least one selected from the group consisting of a polysiloxane base rubber, a one-part silicone rubber, a butadiene base rubber, and an acrylic base rubber.

The polymer may include at least one selected from the group consisting of polydimethylsiloxane (PDMS), polyethylene terephthalate (PET), polyvinylidene fluoride (PVDF), polyethersulfone (PES), polystyrene (PS), polycarbonate (PC), polyimide (PI), polyethylene naphthalate (PEN), and polyarylate (PAR).

The flexible and stretchable complex may have pores having a diameter of 1 nm to $10^6$ nm. The pores may further improve flexibility and stretchabiblity of the flexible and stretchable complex.

The flexible and stretchable complex may have a strain rate of 1,000% or lower. The flexible and stretchable complex may have properties of stretching up to 1,000% when force is applied to the flexible and stretchable complex and of returning nearly to an original length within a short time when the force is removed.

The flexible and stretchable complex may have an electrical conductivity of $1\times10^{15}$ S/cm to $1\times10^{7}$ S/cm. The flexible and stretchable complex may have excellent electrical conductivity, without deteriorating in electrical characteristics despite a high strain rate.

The nanomaterials may be present in an amount of 0.01 wt % to 80 wt % in the flexible and stretchable complex. When the amount of the nanomaterials is less than 0.01 wt % in the flexible and stretchable complex, the flexible and stretchable complex has a low electrical conductivity, not achieving a purpose of the present disclosure of imparting electroconductive properties to the flexible and stretchable polymer. When the amount of the nanomaterials is greater than 80 wt % in the flexible and stretchable complex, a small amount of the polymer is present in the flexible and stretchable complex, thereby reducing flexibility and stretchability of the flexible and stretchable complex.

The flexible and stretchable complex according to the embodiment has excellent electrical conductivity as the graphene-nanomaterial complex is dispersed in the flexible and stretchable polymer to form a 3D network. Further, the flexible and stretchable complex has flexibility and stretchability and thus may be applied to flexible and stretchable electronic devices, such as a flexible and stretchable display and a skin attachable sensor.

A fourth aspect of the present disclosure provides a method of manufacturing a flexible and stretchable complex which includes manufacturing a graphene-nanomaterial complex by the method according to the second aspect and including the graphene-nanomaterial complex in a flexible and stretchable polymer by impregnating the graphene-nanomaterial complex in a solution including the flexible and stretchable polymer and curing the graphene-nanomaterial complex.

Figure 5:
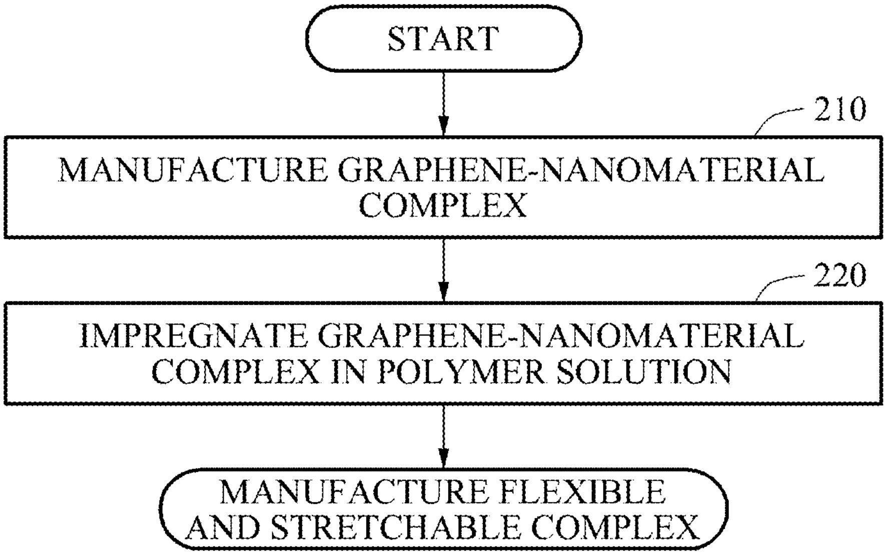
FIG. 5 is a flowchart illustrating a method of manufacturing a flexible and stretchable complex according to an example embodiment.

FIG. 5 is a flowchart illustrating a method of manufacturing a flexible and stretchable complex according to an example embodiment. Referring to FIG. 5, the method of manufacturing the flexible and stretchable complex according to the embodiment includes manufacturing a graphene-nanomaterial complex in operation 210 and impregnating the graphene-nanomaterial complex in a polymer solution in operation 220.

The manufacturing of the graphene-nanomaterial complex may be performed by the method according to the second aspect.

In the impregnating of the graphene-nanomaterial complex in the polymer solution, the graphene-nanomaterial complex is impregnated in a solution including a flexible and stretchable polymer and is cured so that the polymer includes the graphene-nanomaterial complex.

The polymer is a polymer material having flexibility and stretchabiblity at about room temperature, which may include, for example, at least one selected from the group consisting of a polysiloxane base rubber, a one-part silicone rubber, a butadiene base rubber, and an acrylic base rubber. The one-part silicone rubber is a rubber elastomer reacting with moisture in the air without any curing agent to be naturally cured at room temperature, which has a property of being easily bonded to most materials upon being cured.

The polymer may include at least one selected from the group consisting of PDMS, PET, PVDF, PES, PS, PC, PI, PEN, and PAR.

The solution including the flexible and stretchable polymer may include at least one solvent selected from the group consisting of water, distilled water (ultrapure water), aqueous solutions of NaOH, KOH, $NH_4OH$, LiOH and $Ca(OH)_2$, acetone, methyl ethyl ketone, methyl alcohol, ethyl alcohol, isopropyl alcohol, butyl alcohol, ethylene glycol, polyethylene glycol, tetrahydrofuran, dimethylformamide, dimethylacetamide, N-methyl-2-pyrrolidone, hexane, cyclohexanone, toluene, chloroform, dichlorobenzene, dimethylbenzene, trimethylbenzene, pyridine, methylnaphthalene, nitromethane, acrylonitrile, octadecylamine, aniline, and dimethyl sulfoxide.

When the solution including the flexible and stretchable polymer is manufactured, the solvent and pores may be removed by heating under a vacuum condition. The solvent and pores may be removed by heating and creating a vacuum state.

In curing, a curing agent may be added to the solution including the flexible and stretchable polymer, so that a curing process is achieved, thereby manufacturing a flexible and stretchable complex. Here, when the flexible and stretchable polymer is a one-part silicone rubber, moisture in the air functions as a curing agent, without adding any curing agent.

The curing agent may include at least one selected from the group consisting of sulfur, organic peroxides, amine base compounds, a silicone resin, and acid anhydrides.

Curing may be performed by mixing the solution including the flexible and stretchable polymer and the curing agent, followed by natural curing, heat curing or photo curing. Photo curing may be performed by ultraviolet (UV) irradiation. After curing, a flexible and stretchable complex in which the flexible and stretchable polymer includes the graphene-nanomaterial complex is formed.

Hereinafter, the present disclosure will be described in detail with reference to the following example and comparative example. However, the technical idea of the present disclosure is not limited or restricted thereto.

EXAMPLE

Manufacture of 3D Graphene Structure

Oxide graphene was manufactured using highly ordered pyrolytic graphite (HOPG) from Bay Carbon Inc. and a Hummers' method. Specifically, oxide graphene, obtained by oxidizing HOPG dispersed in sulfuric acid with potassium permanganate and hydrogen peroxide ($H_2O_2$), from which impurities were removed using a diluted solution of hydrochloric acid and distilled water, was dried at room temperature in a vacuum oven for about four days, thereby manufacturing oxide graphene powder. The oxide graphene powder was dispersed at 1 mg/ml and subjected to hydrothermal reaction at 180° C. for 1 hour to obtain a 3D graphene structure solution, from which the solvent was removed using freeze-drying, thereby obtaining a 3D graphene structure.

Preparation of Silver Nanowire

A silver nanowire for use was obtained by dispersing a silver nanowire from Kechuang CO., LTD in ethylene glycol.

Manufacture of 3D Graphene-Silver Nanowire Complex

A process of impregnating the 3D graphene structure in a silver nanowire solution and drying the solvent at 70° C. was repeated a plurality of times, thereby manufacturing a 3D graphene-silver nanowire complex.

Manufacture of Flexible and Stretchable Complex Including 3D Graphene-Silver Nanowire Complex The manufactured 3D graphene-silver nanowire complex was impregnated in a mixture of polydimethylsiloxane (PDMS, Sylgard 184 from Dow Corning Co.) and a curing agent under a vacuum condition and cured at 80° C. for 1 hour, thereby manufacturing a flexible and stretchable complex including a 3D graphene-silver nanowire complex.

Figure 6:
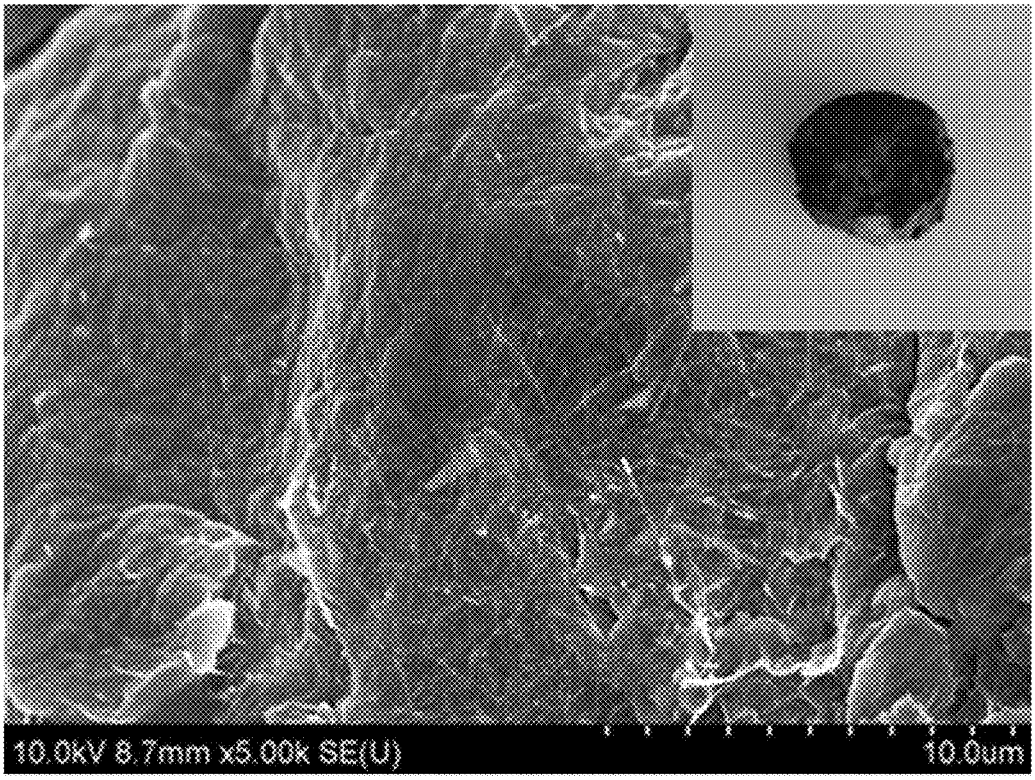
FIG. 6 illustrates a scanning electron microscope (SEM) image of a flexible and stretchable complex and a picture (inset) of the flexible and stretchable complex according to an example.

FIG. 6 illustrates a scanning electron microscope (SEM) image of the flexible and stretchable complex and a picture (inset) of the flexible and stretchable complex according to the example. As illustrated in FIG. 6, the 3D graphene is in contact with the silver nanowire in the PDMS polymer to form a network.

Figure 7:
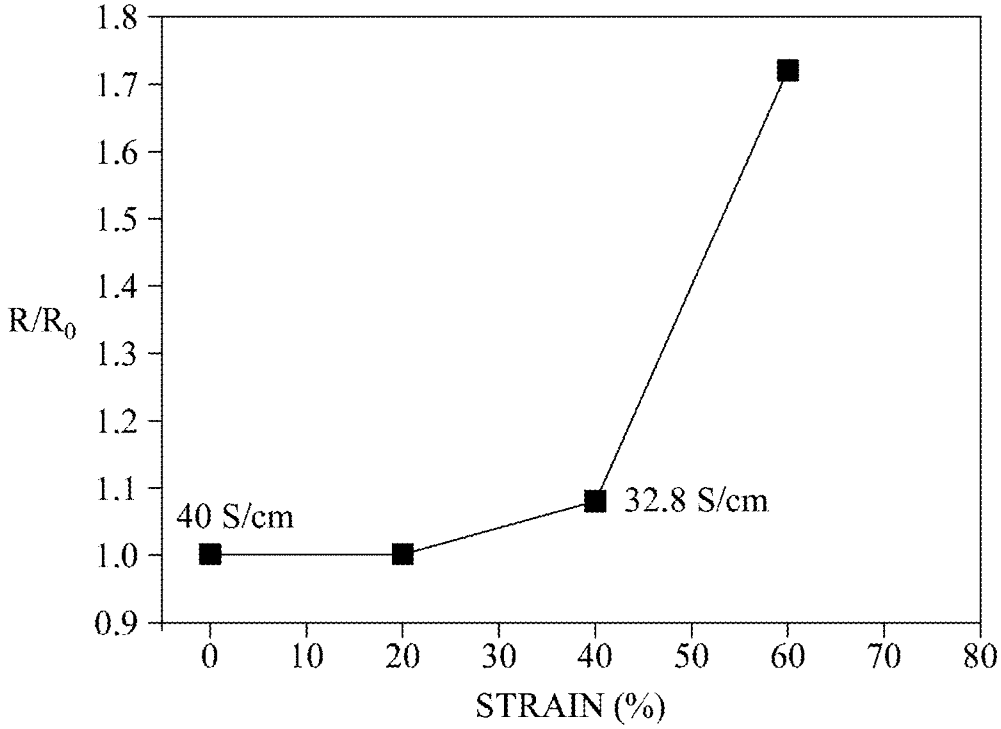
FIG. 7 is a graph illustrating a change in electric resistance of a flexible and stretchable complex stretching according to the example.

FIG. 7 is a graph illustrating a change in electric resistance of a flexible and stretchable complex stretching according to the example. Referring to FIG. 7, the manufactured flexible and stretchable complex has a high conductivity of 40 S/cm and exhibits excellent characteristics of increasing in resistance only by about 1.7 times when stretching 60%. Since the metal nanowire as an additive having excellent conductivity is used along with the 3D graphene structure to manufacture the complex and the flexible and stretchable complex including the complex, the flexible and stretchable complex is stretchable and does not allow a decrease in electrical conductivity when stretching.

Although the present disclosure has been described with reference to a few example embodiments and the accompanying drawings, the present disclosure is not limited to the described example embodiments. Instead, it will be apparent to those skilled in the art that various modifications and variations may be made from the foregoing descriptions. Therefore, the scope of the present disclosure is not limited by the aforementioned embodiments but is defined by the appended claims and their equivalents.

What is claimed is:

1. A flexible and stretchable complex comprising:

a graphene-nanomaterial complex, the graphene-nanomaterial complex comprising:

a three-dimensional graphene nanostructure comprising a plurality of irregularly arranged and interconnected graphenes; and nanomaterials disposed between the interconnected graphenes, wherein the interconnected graphenes, the nanomaterials or both form an electrical network; and a flexible and stretchable polymer, wherein the graphene-nanomaterial complex is disposed within the polymer to form the flexible and stretchable complex.

2. The flexible and stretchable complex of claim 1, wherein the polymer comprises at least one polymer selected from the group consisting of a polysiloxane base rubber, a one-part silicone rubber, a butadiene base rubber, and an acrylic base rubber.

3. The flexible and stretchable complex of claim 1, wherein the polymer comprises at least one polymer selected from the group consisting of polydimethylsiloxane (PDMS), polyethylene terephthalate (PET), polyvinylidene fluoride (PVDF), polyethersulfone (PES), polystyrene (PS), polycarbonate (PC), polyimide (PI), polyethylene naphthalate (PEN), and polyarylate (PAR).

4. The flexible and stretchable complex of claim 1, wherein the flexible and stretchable complex has a strain rate of 1,000% or lower.

5. The flexible and stretchable complex of claim 1, wherein the flexible and stretchable complex has an electrical conductivity of $1\times10^{-15}$ S/cm to $1\times10^{7}$ S/cm.

6. The flexible and stretchable complex of claim 1, wherein the nanomaterials are present in an amount of 0.01% by weight (wt %) to 80 wt % in the flexible and stretchable complex.

7. The flexible and stretchable complex of claim 1, wherein the nanomaterials comprise at least one structure selected from the group consisting of nano particles, a nanorod, a nanotube, and a nanowire.

8. The flexible and stretchable complex of claim 7, wherein the nanomaterials comprise at least one material selected from the group consisting of a metal, a semiconducting material, a conductive polymer, a conductive oxide, a conductive nitride, a conductive carbide, and a carbon nanotube.

9. The flexible and stretchable complex of claim 8, wherein the nanomaterial is a metal selected from the group consisting of silver (Ag), gold (Au), platinum (Pt), ruthenium (Ru), aluminum (Al), iridium (Ir), palladium (Pd), tungsten (W), molybdenum (Mo), iron (Fe), cobalt (Co), and copper (Cu).

10. The flexible and stretchable complex of claim 8, wherein the nanomaterial is a semiconducting material selected from the group consisting of Si, $MoSi_2$, $WSi_2$, $TiSi_2$, $TaSi_2$, $NiCoSi_2$, $NiSi_2$, and $PtSi_2$.

11. The flexible and stretchable complex of claim 8, wherein the nanomaterial is a conductive polymer selected from the group consisting of Poly(fluorene)s, polyphenylenes, polypyrenes, polyazulenes, polynaphthalenes, poly (pyrrole)s (PPY), polycarbazoles, polyindoles, polyazepines, polyanilines (PANI), poly(thiophene)s (PT), poly(3,4-ethylenedioxythiophene) (PEDOT), poly(p-phenylene sulfide) (PPS), Poly(acetylene)s (PAC), and Poly(p-phenylene vinylene) (PPV).

12. The flexible and stretchable complex of claim 8, wherein the nanomaterial is a conductive oxide selected from the group consisting of indium tin oxide (ITO), ZnO, MgO, CaO, SrO, $CoO_x$, $VO_x$, FeO, $MoO_x$, $WO_x$, $Cr_2O_3$, $Ga_{23}$, $Al_2O_3$, $In_2O_3$, $SnO_2$, and $TiO_2$.

13. The flexible and stretchable complex of claim 8, wherein the nanomaterial is a conductive nitride selected from the group consisting of TiN, TaN, NbN, ZrN, $Si_3N_4$, AlN, GaN, InN, and $Mo_2N$.

14. The flexible and stretchable complex of claim 8, wherein the nanomaterial is a conductive carbide selected from the group consisting of WC, TiC, and SiC.

15. The flexible and stretchable complex of claim 8, wherein the nanomaterial is a carbon nanotube selected from the group consisting of a single-walled carbon nanotube (SWCNT), a double-walled carbon nanotube (DWCNT), and a multi-walled carbon nanotube (MWCNT).

16. The graphene-nanomaterial complex of claim 1, wherein the nanomaterials are present in an amount of 10 wt. % to 99.99 wt. % in the graphene-nanomaterial complex.

* * * * *